May 17, 1966     T. H. ELMER ETAL     3,252,036
LAMP HAVING A COLORED ENVELOPE
Filed Jan. 29, 1963
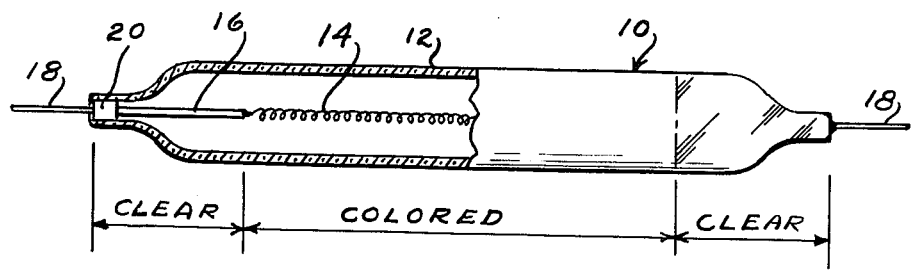
INVENTORS
THOMAS H. ELMER AND
MARTIN E. NORDBERG
BY Milton Peterson
ATTORNEY

United States Patent Office 3,252,036
Patented May 17, 1966

3,252,036
LAMP HAVING A COLORED ENVELOPE
Thomas H. Elmer and Martin E. Nordberg, Corning, N.Y., assignors to Corning Glass Works, Corning, N.Y., a corporation of New York
Filed Jan. 29, 1963, Ser. No. 254,624
3 Claims. (Cl. 313—112)

This invention relates to electric lamps with particular reference to the lamp envelope and its production. It is especially concerned with a consolidated, high silica glass lamp envelope containing an inorganic additive as a colorant.

Consolidated high silica glasses are well known under the generic commercial designation, "96% silica glass." They are particularly characterized by high silica contents and consequent resistance to thermal deformation or breakage by thermal shock. Also, light absorbing impurities are substantially removed during glass processing, and a controlled amount of additive may be introduced by impregnation.

This type of glass is therefore particularly adapted to production of lamp envelopes and filters having prescribed light transmitting characteristics, for example infrared heat lamps. An infrared lamp operates at a sufficiently high temperature to require the thermal resistance of a high silica glass envelope. The lamp envelope is further required to suppress total visible transmission below about 10%, transmit at least 50% in the near infrared, and provide a psychologically effective red color.

United States Patent No. 2,221,709 issued to Hood et al. describes basic production steps for producing consolidated high silica glasses and sets forth a family of particularly suitable parent borosilicate glasses. Briefly, the method includes: (1) forming or fabricating an article of desired shape from a parent borosilicate glass; (2) thermally treating the glass article at a temperature of 500 to 600° C. for a period of time to separate the glass into a silica-rich phase and a silica-poor phase; (3) dissolving or leaching the silica-poor phase, usually with acid, to produce a porous structure composed of the silica-rich phase; (4) washing, to remove leaching residue, and drying; (5) thermally consolidating the porous structure into a non-porous vitreous article. Acid leaching of the phase separated glass leaves a highly siliceous structure retaining its original shape and having a multiplicity of intercommunicating submicroscopic pores. These are closed by thermal consolidation without fusion to form a non-porous glass body of corresponding shape but smaller dimensions. Consolidation temperatures are above 900° C. with about 1250–1300° C. being satisfactory for higher silica content glasses.

United States Patent No. 2,303,756 issued to Nordberg et al. describes a modification of this glass forming technique. The porous glass is impregnated with a solution of an inorganic glass-coloring agent, e.g. a metal salt or other metal compound, and thereafter dried and heated without fusion to close the pores and incorporate the metal ion of the coloring agent within the glass body. For example, the desired deep red color in a heat lamp envelope is achieved with a combination of iron, nickel and aluminum salts which convert to the corresponding oxides during thermal treatment.

However, lamp working such colored glasses, as is required in making stem or terminal seals in electric lamps, presents a problem. This is particularly true in 96% silica glasses containing on the order of a tenth percent or more colorant to provide visible coloration and light absorption. The colored glass fails to soften and become workable at temperatures, or burner settings, normally employed with these high silica glasses.

We have now found that the glass emissivity characteristic of a 96% silica glass undergoes a change when a colorant is added to the glass; further, that the difficulty in lamp working colored glass is traceable to this phenomenon. The degree of change generally increases with glass thickness and colorant concentration in the glass. Consequently, a substantial amount of colorant imparts a high emissivity so that heat is rapidly lost by emission. Thus, with relation to an effective sealing or lamp working temperature, a colored 96% silica glass may be as much as about 200° C. below the temperature expected with a particular burner setting. Normally, this could be corrected by burner adjustment. However, since high silica glasses are difficult to work and seal at best, the problem is more serious. We have found that the most convenient solution is to maintain tubing ends, and other sealing zones, free of colorant during the impregnation process.

The improved electric lamp of the invention is characterized by a consolidated high silica glass envelope wherein the envelope has a coloring agent incorporated therein to provide controlled light transmission characteristics and at least one terminal sealing zone completely free of additive with a terminal member sealed thereto.

The invention is further described with reference to the drawing wherein the single figure is a side view, partly broken away, of an incandescent infrared heating lamp produced in accordance with the invention.

In the drawing, infrared heating lamp 10 has a tubular glass envelope 12 composed of clear and colored sections as labeled. It further includes a coiled tungsten resistance wire 14, terminating in enlarged straight portions 16, and external terminal members 18—18 connected to wire portions 16 by thin molybdenum foils 20 to which envelope 12 is sealed. The seal is a pinch seal or other known type of seal employed between molybdenum foil and high silica or quartz-type glass envelopes. Electrical connections are made to terminal members 18 in accordance with conventional means not shown. Optionally, thin tantalum supports may be provided to centrally position filament 14.

In accordance with the present invention, a central section of tubular envelope 12 has a colorant material incorporated therein while end sections are maintained free of such colorant and hence uncolored. The respective sections are indicated in the drawing by legends "colored" and "clear." In lamp 10, the clear sections correspond approximately to enlarged end portions 16 of the filament. The latter run relatively cooler than the coiled portion and hence do not require color filtering. However, it will be apparent that the clear end sections may be shorter and restricted to that portion of the envelope actually softened and sealed to the terminal or conductor member.

A porous glass envelope, such as an envelope 12, may be selectively or partially colored in various ways. The usual "wet" impregnation process involves immersing a plurality of envelopes in batch style into a solution of the coloring material. Customarily, solution is introduced into the pores of the porous glass envelope from both surfaces. It may, however, be restricted to the outer surface if a clear inner surface is desired.

Where solution is introduced from both surfaces, it is convenient to apply an impermeable, evanescent, organic coating over the surface of the end sections that are to be maintained clear. The coating volatilizes or burns off during a later firing step. If internal stoppers are inserted in the envelope for impregnation from the outer surface only, the coating may also be convenient to use. However, the coating may be omitted if the envelope ends are capped with tight fitting, inert, plastic caps corresponding in length to the desired clear end zone.

These procedures are particularly adapted to an impregnation process where tubes are immersed in a bath. In such an operation, impregnation must occur slowly to permit attaining relative uniformity of color in all envelopes despite time variations in handling. Accordingly, it is desirable that the porous envelopes be wet when immersed, since wet porous glass is impregnated, that is penetrated by solution, at a considerably slower rate than dry glass.

Another possible method involves rolling a porous glass tube across a resilient, sponge-like surface containing the impregnating solution. The impregnating solution is picked up and drawn into the glass pores or capillaries from the surface. The rolling is continued for sufficient time to permit the desired degree or depth of impregnation. This procedure is adapted to use on dry glass where faster impregnation is desired and feasible. It is particularly convenient to use where a substantial portion of the envelope is to remain clear or unimpregnated.

By way of specific illustration, the invention is described with reference to production of a lamp envelope such as envelope 12.

A length of porous high silica glass tubing was produced in accordance with procedures and materials generally described in previously mentioned United States Patent No. 2,303,756. Tubing was drawn in conventional manner from a suitable borosilicate glass melt and heat treated at a temperature of 550 to 600° C. for sufficient time to separate the glass into a silica-rich phase and a silica-poor phase. The silica-poor phase was removed by acid leaching to provide a porous skeleton composed of the residual silica-rich phase and retaining the original tubular shape.

The porous tubing thus produced was provided with an inert plastic cap over each open end. The cap extended a distance up the external tube wall coincident with the clear end portions shown in the drawing. The capped tubing was immersed wet for about 35 minutes in an impregnating solution composed of a mixture of 300 grams each of iron, nickel, and aluminum nitrates dissolved in sufficient 0.1 normal nitric acid to provide one liter of solution. This was sufficient to produce impregnation just short of the inner surface in this tubing having a 1.25 mm. wall thickness in the porous state.

The tubing was removed, thoroughly rinsed to remove residual impregnating materials from the surface and dried by application of forced air to the tubing surface. The tubing remained capped during drying so that evaporation occurred from the outside surface only. The dried tubing was heated in air to a temperature of about 850° C. at a rate of 100° C. per hour, then transferred to a vacuum furnace at 900° C. After a half hour hold to attain equilibrium, it was heated to a temperature of 1250° C. with hold times of one hour each at 950° C., 1000° C., and 1050° C. It was held for about a half hour at 1250° C. to insure complete consolidation of the impregnated porous glass to a non-porous condition. A measurement, made through one wall of the consolidated glass tube envelope with an unfiltered photronic foot candle meter with a 2700° K. tungsten light source, showed a luminum transmittance of 4.5%.

The preceding description has been provided in order to illustrate a preferred embodiment and practice of the invention. Various modifications and alternative embodiments will be readily apparent within the scope of the appended claims. In particular, the invention is generally applicable to the production of lamp envelopes regardless of the particular impregnating materials introduced into the glass.

What is claimed is:

1. An electric lamp envelope comprising a unitary, non-porous 96% silica glass envelope said envelope being substantially homogeneous, and having a coloring agent incorporated therein to provide controlled light transmission characteristics, and having at least one terminal sealing zone in said glass envelope, said sealing zone being essentially free of coloring agent and having a terminal member sealed thereto.

2. An electric lamp envelope comprising a non-porous, unitary 96% silica glass envelope, said envelope being substantially homogeneous and having a normally light transmitting wall portion with a coloring agent incorporated therein to control light transmission, and a terminal laterally contiguous wall portion adjacent to said coloring agent containing wall portion, said terminal wall portion being essentially free of coloring agent, and a terminal member sealed to said terminal wall portion.

3. An infrared radiation lamp comprising a tungsten filament having enlarged end portions sealed to a tubular 96% silica glass envelope, said envelope being substantially homogeneous and having a central portion in which a coloring agent is incorporated to provide a substantially uniform color, said envelope having end portions coincident with the enlarged filament ends, said end portions being essentially free of coloring agent.

References Cited by the Examiner

UNITED STATES PATENTS

| | | | |
|---|---|---|---|
| 1,968,822 | 8/1934 | Gaidies et al. | 313—221 |
| 1,968,854 | 8/1934 | Pirani et al. | 313—221 |
| 1,971,941 | 8/1934 | Pirani | 313—112 |
| 2,182,732 | 12/1939 | Meyer et al. | 313—221 X |
| 2,303,756 | 12/1942 | Nordberg | 106—54 |
| 2,405,261 | 8/1946 | Levi et al. | 313—112 |
| 2,982,053 | 5/1961 | Elmer | 117—124 |
| 3,093,508 | 6/1963 | Wartenberg | 117—124 |

GEORGE N. WESTBY, *Primary Examiner.*

ROBERT SEGAL, *Examiner.*

D. E. SRAGOW, R. DZIURGOT, *Assistant Examiners.*